(12) United States Patent
Suzuki et al.

(10) Patent No.: US 11,489,735 B2
(45) Date of Patent: Nov. 1, 2022

(54) DYNAMIC NETWORK ALLOCATION APPARATUS, DYNAMIC NETWORK ALLOCATION METHOD AND NON-TRANSITORY COMPUTER-READABLE MEDIUM

(71) Applicant: NIPPON TELEGRAPH AND TELEPHONE CORPORATION, Tokyo (JP)

(72) Inventors: Akito Suzuki, Musashino (JP); Shigeaki Harada, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/421,432

(22) PCT Filed: Jan. 23, 2020

(86) PCT No.: PCT/JP2020/002377
§ 371 (c)(1),
(2) Date: Jul. 8, 2021

(87) PCT Pub. No.: WO2020/162211
PCT Pub. Date: Aug. 13, 2020

(65) Prior Publication Data
US 2022/0124003 A1    Apr. 21, 2022

(30) Foreign Application Priority Data
Feb. 6, 2019   (JP) .............................. JP2019-020138

(51) Int. Cl.
*H04L 41/16*   (2022.01)
*H04L 41/0896*  (2022.01)
(Continued)

(52) U.S. Cl.
CPC .......... *H04L 41/16* (2013.01); *G05B 13/0265* (2013.01); *G06N 7/005* (2013.01); *H04L 41/0896* (2013.01); *H04L 41/12* (2013.01)

(58) Field of Classification Search
CPC ..... H04L 41/16; H04L 41/0896; H04L 41/12; G05B 13/0265; G06N 7/005
See application file for complete search history.

(56) References Cited

U.S. PATENT DOCUMENTS

2019/0182169 A1* 6/2019 Li ........................ G06F 9/45558
2020/0034701 A1* 1/2020 Ritter ........................ G06F 9/50
(Continued)

FOREIGN PATENT DOCUMENTS

WO    2018/142700    8/2018

OTHER PUBLICATIONS

Rashid Mijumbi et al., "Design and Evaluation of Learning Algorithms for Dynamic Resource Management in Virtual Networks", 2014 IEEE Network Operations and Management Symposium(NOMS), May 5, 2014.

(Continued)

*Primary Examiner* — Tonia L Dollinger
*Assistant Examiner* — Joseph M Cousins
(74) *Attorney, Agent, or Firm* — IPUSA, PLLC

(57) ABSTRACT

A control apparatus that dynamically allocates a virtual network for providing a network service to a physical network through deep reinforcement learning, includes: observation means for receiving input of network configuration information regarding the physical network, network observation information indicating an amount of physical resource of the physical network, and user demand information indicating an amount of demand for the physical resource generated due to a communication action of a user terminal for the network service, and observing a state $s_t$ at (Continued)

a time t; allocation means for selecting an action $a_t$ to change allocation of the virtual network to the physical network in accordance with a policy $\pi$ in the state $s_t$; reward calculation means for calculating a reward $r_{t+1}$ based on a state $s_{t+1}$ to which the state $s_t$ has transitioned due to the action $a_t$; and learning means for learning the policy $\pi$ using the reward $r_{t+1}$.

5 Claims, 5 Drawing Sheets

(51) Int. Cl.
*G05B 13/02* (2006.01)
*G06N 7/00* (2006.01)
*H04L 41/12* (2022.01)

(56) References Cited

U.S. PATENT DOCUMENTS

| | | |
|---|---|---|
| 2020/0073697 A1 | 3/2020 | Suzuki et al. |
| 2020/0117494 A1* | 4/2020 | Cortez ................. G06F 9/5088 |
| 2020/0241921 A1* | 7/2020 | Calmon ............... G06N 3/0454 |
| 2020/0265305 A1* | 8/2020 | Budden ................. G06N 20/00 |

OTHER PUBLICATIONS

Volodymyr Mnih et al., "Human-level control through deep reinforcement learning", Nature, vol. 518, 2015, pp. 529-533.
Volodymyr Mnih et al., "Asynchronous Methods for Deep Reinforcement Learning", Proceedings of the 33rd International Conference on Machine Learning, 2016, PMLR 48, Jun. 20, 2016.

* cited by examiner

DYNAMIC NETWORK ALLOCATION APPARATUS, DYNAMIC NETWORK ALLOCATION METHOD AND NON-TRANSITORY COMPUTER-READABLE MEDIUM

TECHNICAL FIELD

The present invention relates to a control apparatus, a control method, and a program.

BACKGROUND ART

A technology called NFV (Network Functions Virtualization) that makes it possible to provide various network services by flexibly combining virtual network functions (VNFs) is known. These network services are provided by allocating a virtual network (VN) constructed by a service provider to physical resources of a telecommunication carrier.

In recent years, fluctuations in demand for traffic, server resources, or the like have been intensifying due to diversification of network services. In this respect, a technology for dynamically controlling allocation of a virtual network while providing a network service in accordance with such demand fluctuations is known. For example, a method for dynamically allocating a virtual network is known that can follow fluctuations in demand for traffic by learning, in advance, the relationship between network states and optimal control methods through reinforcement learning, and making calculation time during actual control unnecessary (NPL 1).

Also, a technique called deep reinforcement learning is known in which a function to which a state in reinforcement learning is input and that outputs an action is approximated by a deep neural network (NPLs 2 and 3).

CITATION LIST

Non Patent Literature

[NPL 1] R. Mijumbi et al., "Design and evaluation of learning algorithms for dynamic resource management in virtual networks," Network Operations and Management Symposium (NOMS), 2014.

[NPL 2] Mnih, Volodymyr, et al. "Human-level control through deep reinforcement learning." Nature 518.7540 (2015): 529.

[NPL 3] Mnih, Volodymyr, et al. "Asynchronous methods for deep reinforcement learning." International conference on machine learning. 2016.

SUMMARY OF THE INVENTION

Technical Problem

However, in the dynamic allocation method disclosed in NPL 1, pre-learning needs to be performed by means of reinforcement learning for the number of possible network states, and it is therefore necessary to express the network states as the number of states. Accordingly, only network states that are discrete and low-dimensional (i.e. that can be expressed with a small number of variables) can be handled, and the accuracy of virtual network allocation is low (i.e. the efficiency of use of physical resources is low) in some cases.

On the other hand, since deep reinforcement learning enables learning of appropriate output with respect to continuous and high-dimensional input, it is considered that continuous and high-dimensional network states can be handled by applying deep reinforcement learning.

The present invention has been made in view of the foregoing, and an object of the invention is to improve the efficiency of use of physical resources in dynamic virtual network allocation.

Means for Solving the Problem

To achieve the above-stated object, a control apparatus according to an embodiment of the present invention is a control apparatus that dynamically allocates a virtual network for providing a network service to a physical network through deep reinforcement learning, including: observation means for receiving input of network configuration information regarding the physical network, network observation information indicating an amount of physical resource of the physical network, and user demand information indicating an amount of demand for the physical resource generated due to a communication action of a user terminal for the network service, and observing a state $s_t$ at a time t; allocation means for selecting an action $a_t$ to change allocation of the virtual network to the physical network in accordance with a policy π in the state $s_t$; reward calculation means for calculating a reward $r_{t+1}$ based on a state $s_{t+1}$ to which the state $s_t$ has transitioned due to the action $a_t$; and learning means for learning the policy π using the reward $r_{t+1}$.

Effects of the Invention

The efficiency of use of physical resources in dynamic virtual network allocation can be improved.

DESCRIPTION OF EMBODIMENTS

Hereinafter, an embodiment of the present invention will be described in detail with reference to the drawings.

Overall Configuration

Figure 1:
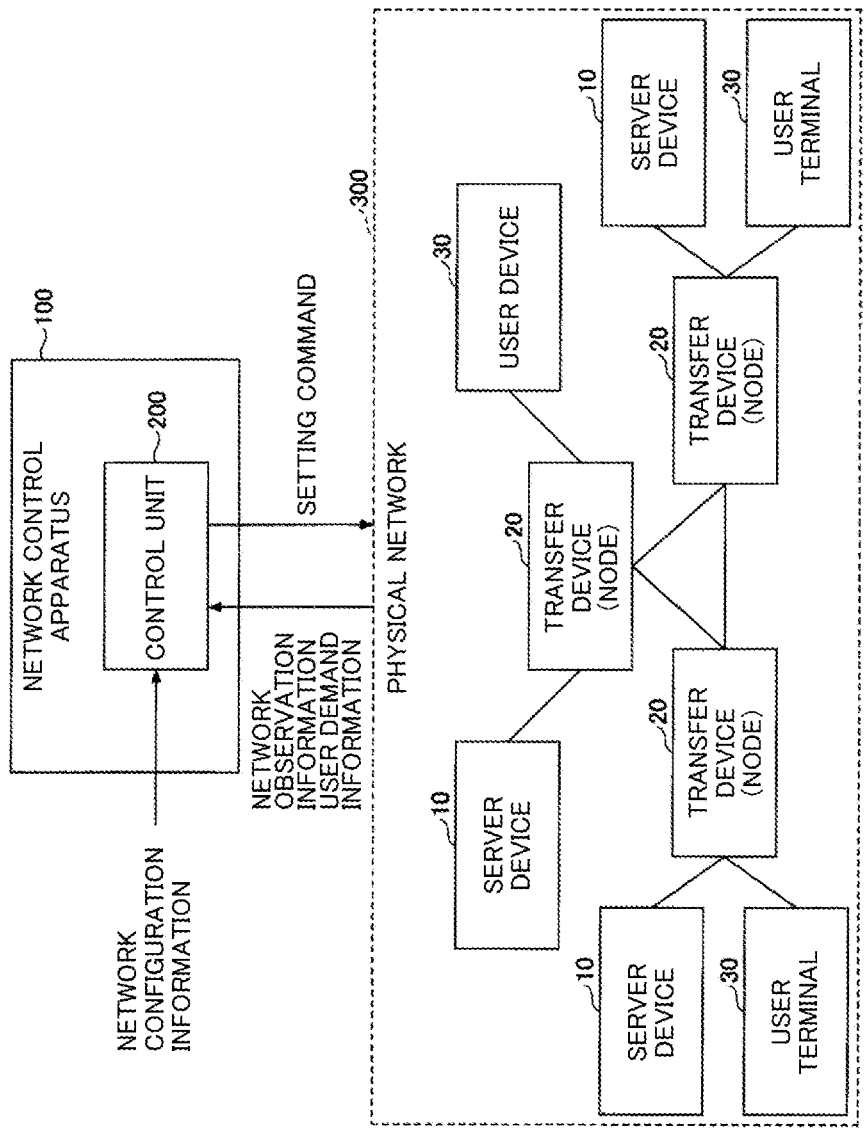
FIG. 1 is a diagram showing an example of an overall configuration of a system according to an embodiment of the present invention.

First, an overall configuration of a system according to the embodiment of the present invention will be described with reference to FIG. 1. FIG. 1 is a diagram showing an example of the overall configuration of the system according to the embodiment of the present invention.

As shown in FIG. 1, the system according to the embodiment of the present invention includes a network control apparatus 100 that is connected to a physical network 300. The physical network 300 is a network environment of a telecommunication carrier, and includes server devices 10, transfer devices 20, and user terminals 30, for example.

The network control apparatus 100 is a computer or a computer system that has a control unit 200. The network control apparatus 100 dynamically allocates, using the control unit 200, a virtual network (hereinafter referred to simply as a "VN") constructed by a service provider to the physical network 300 (i.e. the network control apparatus 100 functions as an NFV orchestrator using the control unit 200). At this time, the control unit 200 realizes dynamic VN allocation capable of following VN demand by pre-learning the relationship between the network states (hereinafter also referred to simply as "NW states") and appropriate VN allocation methods through deep reinforcement learning.

Thus, the dynamic VN allocation with high efficiency of use of physical resources can be realized even if the NW states are continuous and high-dimensional. Note that the dynamic VN allocation includes not only locating virtual network functions (hereinafter also referred to simply as "VNFs") to physical resources but also locating virtual machines (hereinafter also referred to simply as "VMs") to physical resources and determining optimal paths between VNFs, between VMs, and between VNFs and VMs, for example.

Here, VN allocation to the physical network 300 is performed as a result of a setting command indicating optimal VN allocation being transmitted to the server devices 10 and the transfer devices 20 by the control unit 200.

The NW states refer to the amount of each of the physical resource (e.g. the server capacity of each server device 10 and the link capacity of each transfer device 20) included in the physical network 300, or the like. The VN demand refers to the amount of demand for physical resources required to provide a network service (e.g. the traffic volume (i.e. data volume) of a certain link included in the physical network 300, and the number of VMs that need to be constructed on a server device 10), or the like. The NW states and the VN demand are obtained from network configuration information, network observation information, user demand, and so on, which are input to the network control apparatus 100.

The network configuration information refers to network topology information regarding the physical network 300, constraints for physical resources (e.g. the amount of each physical resource), or the like, for example. The network observation information refers to traffic information that indicates the traffic volume of each link that constitutes the physical network 300, and server use information that indicates the server capacity of each server device 10 and the number of VMs, for example. The user demand information refers to information that indicates the amount of demand for VMs, VNFs, or the like necessary for each user terminal 30, the amount of demand for traffic, or the like, for example.

Each server device 10 is a computer or a computer system that realizes a VNF allocated by the network control apparatus 100. Each server device 10 collects server use information and transmits the collected server use information to the network control apparatus 100. Also, each server device 10 processes traffic in accordance with the VNF allocated by the network control apparatus 100, and generates the traffic. Note that, in the following description, the server devices 10 will be referred to as a "server device $10_1$", a "server device $10_2$", and so on when the plurality of server devices 10 are distinguished from each other.

Each transfer device 20 is a device that functions as a node for transferring traffic. Each transfer device 20 collects traffic information and transmits the collected traffic information to the network control apparatus 100. Also, each transfer device 20 processes traffic in accordance with path information. Note that the path information refers to information that indicates paths between VMs and VNFs, between VMs and VNFs, and so on, for example. Note that, in the following description, the transfer devices 20 will be referred to as a "transfer device 201", a "transfer device 202", and so on, when the plurality of transfer devices 20 are distinguished from each other.

Each user terminal 30 is a computer that transmits traffic generated by a user's communication action (e.g. an operation to start using a network service etc.) to the other user terminals 30, the server devices 10, or the like. Also, each user terminal 30 transmits user demand information to the network control apparatus 100. Note that, in the following description, the user terminals 30 will be referred to as a "user terminal 301", a "user terminal 302", and so on, when the plurality of user terminals 30 are distinguished from each other.

Hardware Configuration of Network Control Apparatus 100

Figure 2:
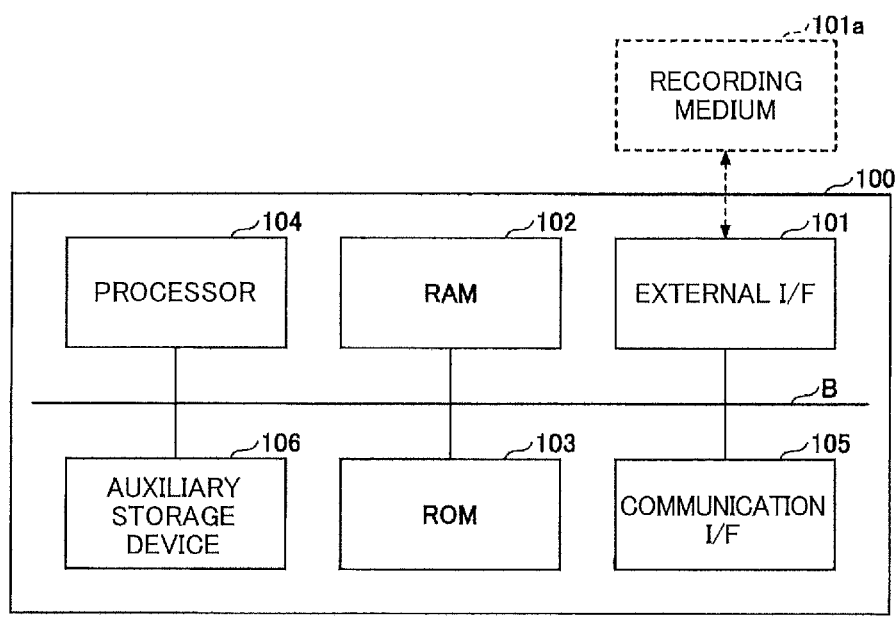
FIG. 2 is a diagram showing an example of a hardware configuration of a network control apparatus according to the embodiment of the present invention.

Next, a hardware configuration of the network control apparatus 100 according to the embodiment of the present invention will be described with reference to FIG. 2. FIG. 2 is a diagram showing an example of the hardware configuration of the network control apparatus 100 according to the embodiment of the present invention.

Figure 4:
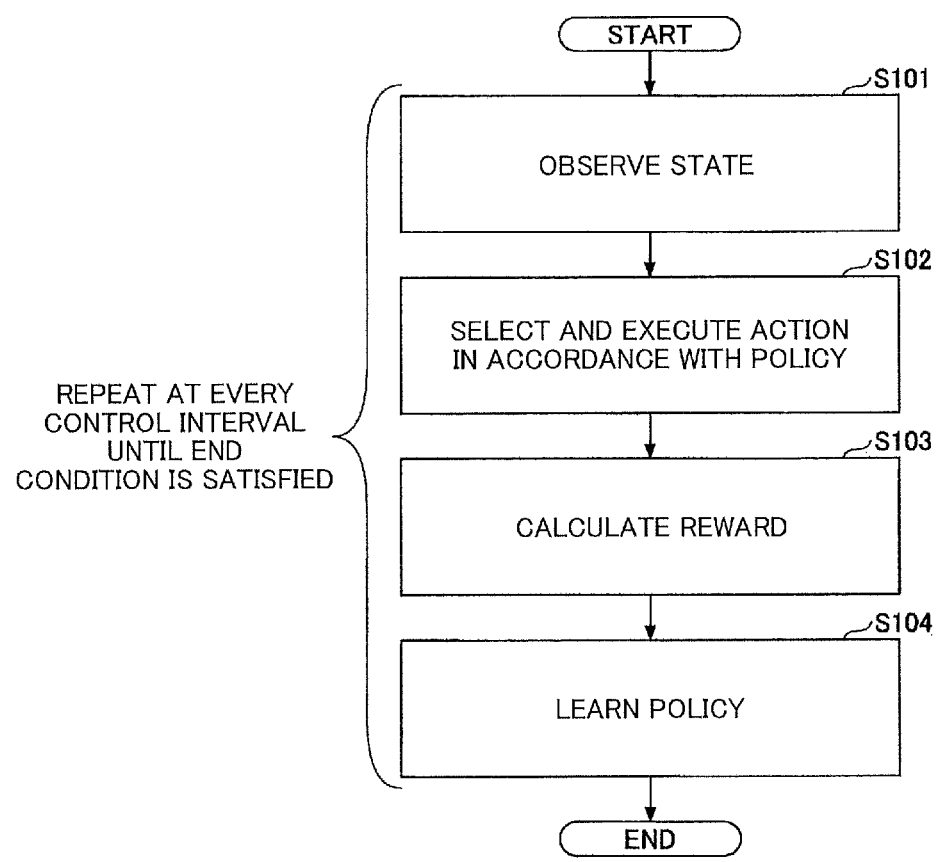
FIG. 4 is a flowchart showing an example of pre-learning processing according to the embodiment of the present invention.

As shown in FIG. 4, the network control apparatus 100 according to the embodiment of the present invention has hardware including an external I/F 101, a RAM (Random Access Memory) 102, a ROM (Read Only Memory) 103, a processor 104, a communication I/F 105, and an auxiliary storage device 106. These pieces of hardware are communicably connected to each other via a bus B.

The external I/F 101 is an interface for external devices. The external devices include a recording medium 101a and the like. The network control apparatus 100 can read the recording medium 101a and write to the recording medium 101a via the external I/F 101.

The recording medium 101a may be, for example, a flexible disk, a CD (Compact Disc), a DVD (Digital Versatile Disk), an SD memory card (Secure Digital memory card), a USB (Universal Serial Bus) memory card, or the like.

The RAM 102 is a volatile semiconductor memory for temporarily holding programs and data. The ROM 103 is a nonvolatile semiconductor memory capable of holding programs and data even after power is turned off. For example, setting information regarding an OS (Operating System), setting information regarding a communication network, and the like are stored in the ROM 103.

The processor 104 is, for example, a CPU (Central Processing Unit), a GPU (Graphics Processing Unit), or the like, and is an arithmetic unit that loads a program, data, or the like from the ROM 103, the auxiliary storage device 106, or the like to the RAM 102, and performs processing.

The communication I/F 105 is an interface for connecting the network control apparatus 100 to the physical network 300.

The auxiliary storage device 106 is, for example, an HDD (Hard Disk Drive), an SSD (Solid State Drive), or the like, and stores various programs and data. The programs and data stored in the auxiliary storage device 106 include an OS, application software that realizes various functions on the OS, a program that realizes the control unit 200, and so on, for example.

The network control apparatus 100 according to the embodiment of the present invention can realize various kinds of processing, which will be described later, due to having the hardware configuration shown in FIG. 2. Although the example shown in FIG. 2 illustrates the case where the network control apparatus 100 according to the embodiment of the present invention is realized by one device (computer), this need not be the case, and the network control apparatus 100 may alternatively be realized by a plurality of devices (computers). Also, one device (computer) may include a plurality of processors 104, a plurality of memories (RAMs 102, ROMs 103, auxiliary storage devices 106 etc.). Also, the network control apparatus 100 may also have a display device and input devices such as a keyboard and a mouse, for example, in addition to the aforementioned hardware.

Functional Configuration of Control Unit 200

Figure 3:
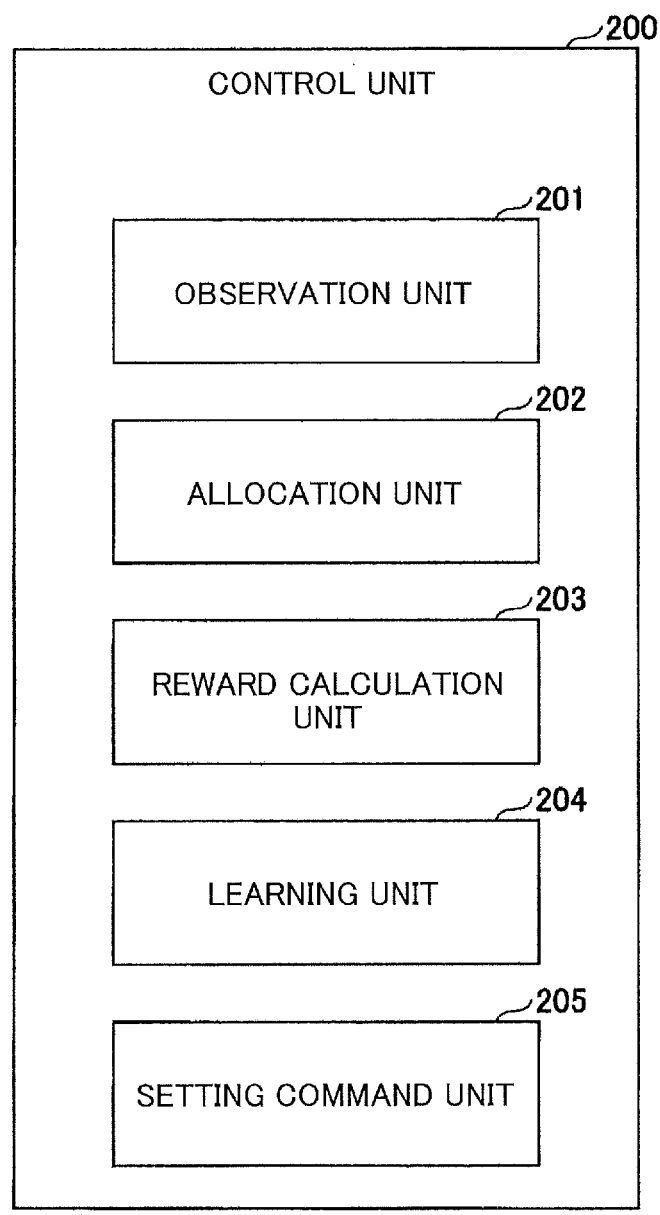
FIG. 3 is a diagram showing an example of a functional configuration of a control unit according to the embodiment of the present invention.

Next, a functional configuration of the control unit 200 according to the embodiment of the present invention will be described with reference to FIG. 3. FIG. 3 is a diagram showing an example of the functional configuration of the control unit 200 according to the embodiment of the present invention.

As shown in FIG. 3, the control unit 200 according to the embodiment of the present invention includes an observation unit 201, an allocation unit 202, a reward calculation unit 203, a learning unit 204, and a setting command unit 205. This control unit 200 is realized by, for example, processing that one or more programs installed in the network control apparatus 100 causes the processor 104 to perform. Note that the observation unit 201, the allocation unit 202, the reward calculation unit 203, and the learning unit 204 correspond to an agent in deep reinforcement learning.

Here, in the embodiment of the present invention, it is assumed that the pre-learning and the dynamic VN allocation are performed at every time t with certain fixed time intervals (hereinafter also referred to as "control intervals"), and a state, an action, and a reward at the time t in deep reinforcement learning are denoted as $s_t$, $a_t$, and $r_t$, respectively. However, in the pre-learning, a time corresponding to the control interval does not need to actually elapse to perform the following learning.

The observation unit 201 observes, as the state $s_t$, the VN demand, the NW states, or the like, during the pre-learning and the dynamic VN allocation. The observation unit 201 observes the state $s_t$ by receiving input of the network configuration information, the network observation information, and the user demand information.

Here, as an example, it is conceivable to define the state $s_t$ as follows.

Maximum value of the number of assumed VNs: $N_{VN}$
ith VN: $VN_i$
Traffic demand at the time t in $VN_i$ (i=1, . . . , $N_{VN}$) (i.e. the amount of demand for traffic required by $VN_i$): $T_t^i$
Server demand at the time t in $VN_i$ (i=1, . . . , $N_{VN}$) (i.e. server capacity required by $VN_i$): $S_t^i$
Remaining link band of a link m (m=1, . . . , M) at the time t: $B_t^m$
Remaining server capacity of a server device $10_k$ (k=1, . . . , K) at the time t: $C_t^k$ At this time, the state $s_t$ is defined as:

$$s_t = [T_t^1, \ldots, T_t^{NVN}, S_t^1, \ldots, S_t^{NVN}, B_t^1, \ldots, B_t^M, C_t^1, \ldots, C_t^K]$$

Also, for example, when traffic demand until a past time t−T is considered, the state $s_t$ may be defined as:

$$s_t = [T_{t-T}^1, \ldots, T_t^1, \ldots, T_{t-T}^{NVN}, \ldots, T_t^{NVN}, S_t^1, \ldots, S_t^{NVN}, B_t^1, \ldots, B_t^M, C_t^1, \ldots, C_t^K]$$

During the pre-learning and the dynamic VN allocation, the allocation unit 202 selects and executes a change of VN allocation, as the action $a_t$, in accordance with the policy $\pi$ in the state $s_t$. Note that, given the state s=st and a=at, the policy $\pi$ is expressed as a=π(s) or a~π(a|s). a~π(a|s) indicates that a is selected (sampled) from a conditional probability distribution π(a|s).

Here, as an example, a parameter to limit the amount of change of VN allocation is denoted as N, and it is conceivable to define the action $a_t$ as follows. Note that a set of selectable actions at is denoted as $\{a_t^1, a_t^2, \ldots \}$.

(1) If N=1,
Action $a_t^1$: The server demand in $VN_1$ is allocated to the server device $10_1$.
Action $a_t^2$: The server demand in $VN_1$ is allocated to the server device 102.
Action $a_t^K$: The server demand in $VN_1$ is allocated to the server device 10K.
Action $a_t^{K+1}$: The server demand in $VN_2$ is allocated to the server device $10_1$.
Action $a_t^{K+2}$: The server demand in $VN_2$ is allocated to the server device $10_2$.
Action $a_t^{2K}$: The server demand in $VN_2$ is allocated to the server device $10_K$.

(2) If N=2,
Action $a_t^1$: The server demand in $VN_1$ is allocated to the server device $10_1$, and the server demand in $VN_2$ is allocated to the server device $10_1$.
Action $a_t^2$: The server demand in $VN_1$ is allocated to the server device $10_1$, and the server demand in $VN_2$ is allocated to the server device $10_2$.
Action $a_t^K$: The server demand in $VN_1$ is allocated to the server device $10_1$, and the server demand in $VN_2$ is allocated to the server device $10_K$.
Action $a_t^{K+1}$: The server demand in $VN_1$ is allocated to the server device $10_2$, and the server demand in $VN_2$ is allocated to the server device $10_1$.
Action $a_t^{K+2}$: The server demand in $VN_1$ is allocated to the server device $10_2$, and the server demand in $VN_2$ is allocated to the server device $10_2$.
Action $a_t^{2K}$: The server demand in $VN_1$ is allocated to the server device $10_2$, and the server demand in $VN_2$ is allocated to the server device $10_K$.

(3) If N=n,
Action $a_t^1$: The server demand in $VN_1$ is allocated to the server device $10_1$, the server demand in $VN_2$ is allocated to the server device $10_1$, . . . , and the server demand in $VN_n$ is allocated to the server device $10_1$.

Thus, if the parameter N=n, n VNs that are $VN_1$ to $VN_n$ are allocated to one or more predetermined server devices 10, of the plurality of server devices 10, for every action at. Note that, for example, the time required to change the VN allocation at each time t can be adjusted by adjusting the parameter N at the time t.

During the pre-learning, if the state transitions from $s_t$ to $s_{t+1}$ due to execution of the action $a_t$, the reward calculation unit 203 calculates a reward $r_{t+1}$.

Here, as an example, it is conceivable to define the reward $r_{t+1}$ as follows. That is to say, first, constraints and objective functions of a VNE (Virtual Network Embedding), which is a kind of optimization problem, are defined as follows.

Constraints: the utilization of the link band is 100% or less, and the utilization of the server capacity is 100% or less Objective functions: link band, server capacity, and the number of times of VN relocation At this time, the reward $r_{t+1}$ is defined as follows so as to minimize the objective functions while satisfying both constraints. Note that VN relocation refers to allocating a VN allocated to a certain server device 10 to another server device 10.

If the constraints are not satisfied, the reward $r_{t+1}=-100$

If the constraints are satisfied but the efficiency of use of one of or both the link band and the server capacity decreases as a result of the VN relocation (i.e. only the minimization of the number of times of VN relocation is realized), the reward $r_{t+1}=-100$ If the constraints are satisfied but the utilization of the link band is 90% or more (e.g. when a sudden traffic fluctuation occurs), the reward $r_{t+1}=0$ If the constraints are satisfied in the cases other than the above (i.e. if the minimization of the utilization of the link band and the utilization of the server capacity are realized), the reward $r_{t+1}=1-$(average utilization of link band+average utilization of server capacity)/2

Thus, the reward $r_{t+1}$ is defined so as to satisfy the constraints and minimize the utilizations of the link band and the server capacity (i.e. improve the efficiency of use of physical resources) while minimizing the number of times of VN relocation to the extent possible.

Note that the above constraints and objective functions are an example. Alternatively, for example, the constraint may be that "network delay is smaller than or equal to a predetermined threshold", and the objective function may be "(the total) power consumption in the server device 10".

During the pre-learning, the learning unit 204 learns the policy π such that the reward $r_t$ to be received in the future is maximized.

During the dynamic VN allocation, the setting command unit 205 transmits a setting command corresponding to the action at executed by the allocation unit 202 to the server devices 10, the transfer devices 20, and so on. Thus, the settings of the server devices 10 and the transfer devices 20 are changed such that the VN allocation changed by the action $a_t$ is configured.

Pre-Learning Processing

Next, pre-learning processing performed before dynamic VN control will be described with reference to FIG. 4. FIG. 4 is a flowchart showing an example of pre-learning processing according to the embodiment of the present invention. The following steps S101 to S104 are repeatedly performed at every time t until a predetermined end condition is satisfied. The predetermined end condition may be, for example, that a predetermined number of times of repetition is reached, or that any index value indicating learning results (e.g. an index value indicating the efficiency of use of physical resources) is a predetermined value or more).

Note that an algorithm of deep reinforcement learning can be any deep reinforcement learning algorithm. For example, DQN (Deep Q-Network) described in NPL 1, A3C (Asynchronous Advantage Actor-Critic) described in NPL 2, or the like can be used.

Step S101: The observation unit 201 receives input of the network configuration information, the network observation information, and the user demand information, and observes the state $s_t$ (i.e. VN demand, NW states etc.). However, if network configuration information does not change at each time t, the network configuration information may be input only at the first time (e.g. only when the time t=1).

Step S102: Next, the allocation unit 202 selects and executes the action $a_t$ (e.g. change of VN allocation) in accordance with the policy π in the state $s_t$. Thus, the state $s_t$ transitions to the state $s_{t+1}$.

Step S103: Next, the reward calculation unit 203 calculates the reward $r_{t+1}$. Note that the reward calculation unit 203 can calculate the reward $r_{t+1}$ by receiving input of the network configuration information, the network observation information, and the user demand information in the state $s_{t+1}$. However, the network configuration information may be input only at the first time, as mentioned above. Alternatively, before step S103 is performed, the state $s_{t+1}$ may be observed by the observation unit 201, and the reward $s_{t+1}$ may be calculated using the observation result.

Step S104: Next, the learning unit 204 learns the policy π such that the reward $r_t$ to be received in the future is maximized.

With the above-described configuration, in the network control apparatus 100 according to the embodiment of the present invention, the policy π is learned such that the reward $r_t$ to be received in the future is maximized (i.e. such that the efficiency of use of physical resources is maximized while minimizing the number of times of VN relocation to the extent possible). At this time, in the embodiment of the present invention, the use of deep reinforcement learning makes discretization of variables such as traffic demand unnecessary, for example. The variables can be handled as continuous values, and information such as the remaining link band of each link and the remaining server capacity of each server device 10 can also be included in the NW states. Accordingly, VN allocation that increases the efficiency of use of physical resources can be realized with high accuracy.

Dynamic VN Allocation Processing

Figure 5:
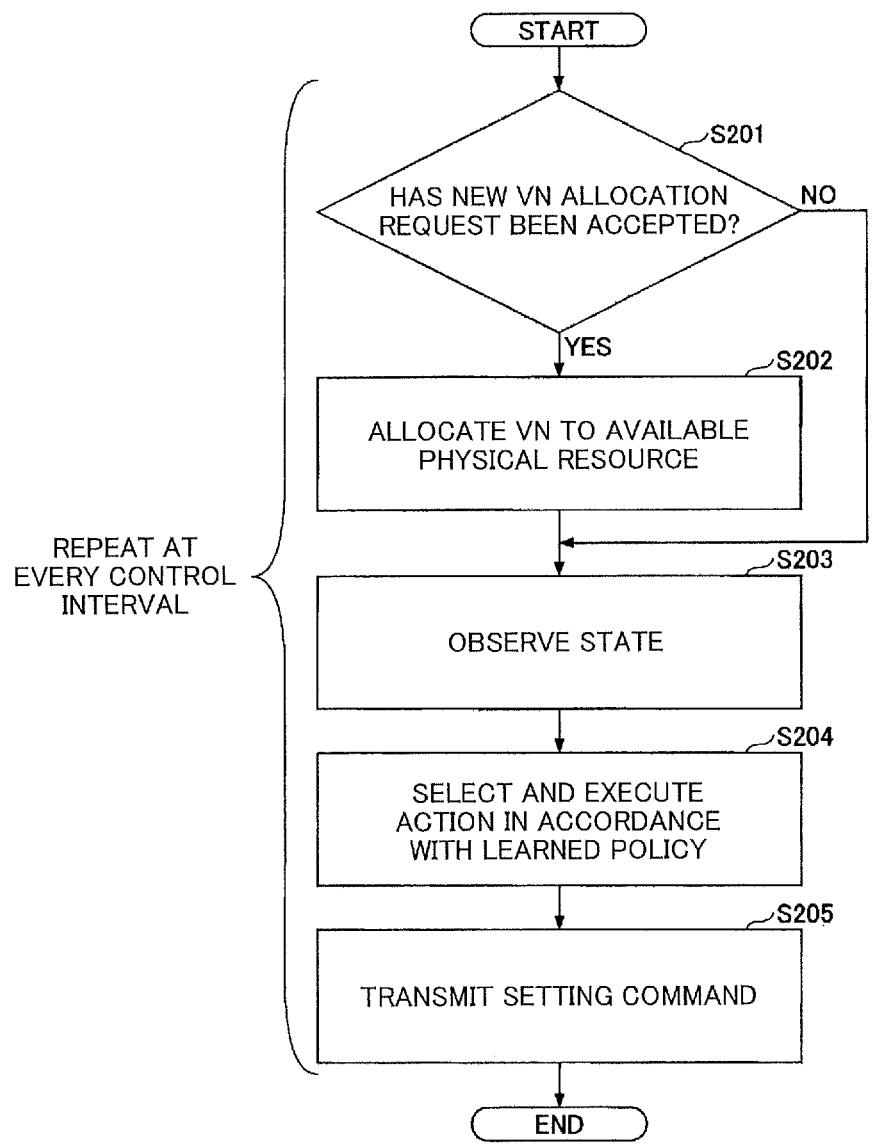
FIG. 5 is a flowchart showing an example of dynamic VN allocation processing according to the embodiment of the present invention.

Next, dynamic VN allocation processing performed while a network service is provided will be described with reference to FIG. 5. FIG. 5 is a flowchart showing an example of the dynamic VN allocation processing according to the embodiment of the present invention. The following steps S201 to S205 are repeatedly performed at every time t (i.e. at every control interval).

Step S201: First, the allocation unit 202 determines whether or not a new VN allocation request has been accepted from the previous time t−1 to the current time t. Here, the new VN allocation request is transmitted from a terminal or the like to the network control apparatus 100 by a service provider of the network service operating the terminal or the like to perform a new VN allocation request operation, for example.

If a new VN allocation request has been accepted, the dynamic VN allocation processing proceeds to step S202. On the other hand, if a new VN allocation request has not been accepted, step S202 is not performed, and the dynamic VN allocation processing proceeds to step S203.

Step S202: The allocation unit 202 allocates a VN corresponding to the new VN allocation request to an available physical resource in the physical network 300.

Step S203: Next, the observation unit 201 receives input of the network configuration information, the network observation information, and the user demand information, and observes the state $s_t$ (i.e. VN demand, NW states etc.). However, if the network configuration information does not change at each time t, the network configuration information may be input only at the first time (e.g. only when the time t=1). Note that, if the above step S202 is performed, the state $s_t$ refers to the VN demand, the NW states, or the like after the VN corresponding to the new VN allocation request has been allocated.

Step S204: Next, the allocation unit 202 selects and executes the action $a_t$ (e.g. change of VN allocation) in accordance with the policy π in the state $s_t$. Here, the policy n is a policy that has been learned through the pre-learning. Thus, an optimal change of VN allocation is selected and executed, and the state $s_t$ transitions to the state $s_{t+1}$.

Step S205: Next, the setting command unit 205 transmits a setting command corresponding to the VN allocation that was changed in the above step S204 to the server devices 10, the transfer devices 20, and so on. Thus, the settings of the server devices 10 and the transfer devices 20 are changed such that the changed VN allocation is configured.

With the above-described configuration, in the network control apparatus 100 according to the embodiment of the present invention, an optimal action $a_t$ (i.e. a change of VN allocation that maximizes the efficiency of use of physical resources while minimizing the number of times of VN relocation to the extent possible) is selected and executed in accordance with the policy π that has been learned through pre-learning.

The present invention is not limited to the above embodiment that has been specifically disclosed, and various variations and modifications may be made without departing from the scope of claims.

REFERENCE SIGNS LIST

Server device
Transfer device
User terminal
100 Network control apparatus
101 External I/F
101*a* Recording medium
102 RAM
103 ROM
104 Processor
105 Communication I/F
106 Auxiliary storage device
200 Control unit
201 Observation unit
202 Allocation unit
203 Reward calculation unit
204 Learning unit
205 Setting command unit
300 Physical network

The invention claimed is:

1. A control method in which a computer that dynamically allocates a virtual network for providing a network service to a physical network through deep reinforcement learning, the control method comprising:
   receiving input of network configuration information regarding the physical network, network observation information indicating an amount of physical resource of the physical network, and user demand information indicating an amount of demand for the physical resource generated due to a communication action of a user terminal for the network service, and observing a state ($s_t$) at a time t;
   selecting an action ($a_t$) to change allocation of the virtual network to the physical network in accordance with a policy π in the state ($s_t$);
   calculating a reward ($r_t$)+1 based on a state ($s_t$)+1 to which the state ($s_t$) has transitioned due to the action ($a_t$); and
   learning the policy π using the reward ($r_t$)+1, wherein
      the reward ($r_t$)+1 is defined so as to satisfy constraints of a VNE problem and minimize objective functions of the VNE problem,
      the constraints of the VNE problem are (i) that a band of each link included in the physical network is 100% or less, and (ii) that server capacity of each server included in the physical network is 100% or less,
      the objective functions of the VNE problem are (i) the band of each link, (ii) the server capacity of each server, and (iii) the number of times of relocation of the virtual network, and
      the reward ($r_t$)+1 is defined such that:
         (1) the reward ($r_t$)+1 is a negative value if the constraints are not satisfied;
         (2) the reward ($r_t$)+1 is a negative value if the constraints are satisfied, but efficiency of use of at least one of the band of each link and the server capacity of each server decreases;
         (3) the reward ($r_t$)+1 is 0 if the constraints are satisfied but the band of each link is greater than or equal to a predetermined threshold; and
         (4) the reward ($r_t$)+1=1−(average utilization of link band+average utilization of server capacity)/2 in cases other than (1) to (3) above.

2. A non-transitory computer-readable medium storing instructions which, when executed by a processing system including at least one processor, cause the processing system to perform operations of dynamically allocating a virtual network for providing a network service to a physical network through deep reinforcement learning, the operations comprising:
   receiving input of network configuration information regarding the physical network, network observation information indicating an amount of physical resource of the physical network, and user demand information indicating an amount of demand for the physical resource generated due to a communication action of a user terminal for the network service, and observing a state ($s_t$) at a time t;
   selecting an action ($a_t$) to change allocation of the virtual network to the physical network in accordance with a policy π in the state ($s_t$);
   calculating a reward ($r_t$)+1 based on a state ($s_t$)+1 to which the state ($s_t$) has transitioned due to the action ($a_t$); and
   learning the policy π using the reward ($r_t$)+1, wherein
      the reward ($r_t$)+1 is defined so as to satisfy constraints of a VNE problem and minimize objective functions of the VNE problem,
      the constraints of the VNE problem are (i) that a band of each link included in the physical network is 100% or less, and (ii) that server capacity of each server included in the physical network is 100% or less,
      the objective functions of the VNE problem are (i) the band of each link, (ii) the server capacity of each server, and (iii) the number of times of relocation of the virtual network, and
      the reward ($r_t$)+1 is defined such that:
         (1) the reward ($r_t$)+1 is a negative value if the constraints are not satisfied;
         (2) the reward ($r_t$)+1 is a negative value if the constraints are satisfied, but efficiency of use of at least one of the band of each link and the server capacity of each server decreases;
- (3) the reward $(r_t)+1$ is 0 if the constraints are satisfied but the band of each link is greater than or equal to a predetermined threshold; and
- (4) the reward $(r_t)+1=1-$(average utilization of link band+average utilization of server capacity)/2 in cases other than (1) to (3) above.

3. A control apparatus that dynamically allocates a virtual network for providing a network service to a physical network through deep reinforcement learning, the control apparatus comprising:
a processor; and
a memory coupled to the processor, the memory storing program instructions that cause the processor to:
receive input of
network configuration information regarding the physical network,
network observation information indicating an amount of physical resource of the physical network, and
user demand information indicating an amount of demand for the physical resource generated due to a communication action of a user terminal for the network service, and observing a state $(s_t)$ at a time t;
select an action $(a_t)$ to change allocation of the virtual network to the physical network in accordance with a policy π in the state $(s_t)$;
calculate a reward $(r_t)+1$ based on a state $(s_t)+1$ to which the state $(s_t)$ has transitioned due to the action $(a_t)$; and
learn the policy π using the reward $(r_t)+1$, wherein
the reward $(r_t)+1$ is defined so as to satisfy constraints of a VNE problem and minimize objective functions of the VNE problem,
the constraints of the VNE problem are (i) that a band of each link included in the physical network is 100% or less, and (ii) that server capacity of each server included in the physical network is 100% or less,
the objective functions of the VNE problem are (i) the band of each link, (ii) the server capacity of each server, and (iii) the number of times of relocation of the virtual network, and
the reward $(r_t)+1$ is defined such that:
- (1) the reward $(r_t)+1$ is a negative value if the constraints are not satisfied;
- (2) the reward $(r_t)+1$ is a negative value if the constraints are satisfied, but efficiency of use of at least one of the band of each link and the server capacity of each server decreases;
- (3) the reward $(r_t)+1$ is 0 if the constraints are satisfied but the band of each link is greater than or equal to a predetermined threshold; and
- (4) the reward $(r_t)+1=1-$(average utilization of link band+average utilization of server capacity)/2 in cases other than (1) to (3) above.

4. The control apparatus according to claim 3, wherein the state $(s_t)$ includes
an amount of demand for traffic required by the virtual network,
an amount of demand for server capacity required by the virtual network,
a remaining band of each link included in the physical network, and
remaining server capacity of each server included in the physical network.

5. The control apparatus according to claim 3, wherein the processor selects the action $(a_t)$ from a predetermined action set, and elements included in the action set are actions indicating allocating N virtual networks to one or more predetermined servers, of a plurality of servers, for each of the elements in accordance with a preset parameter N at every time t.

* * * * *